Figure 1:
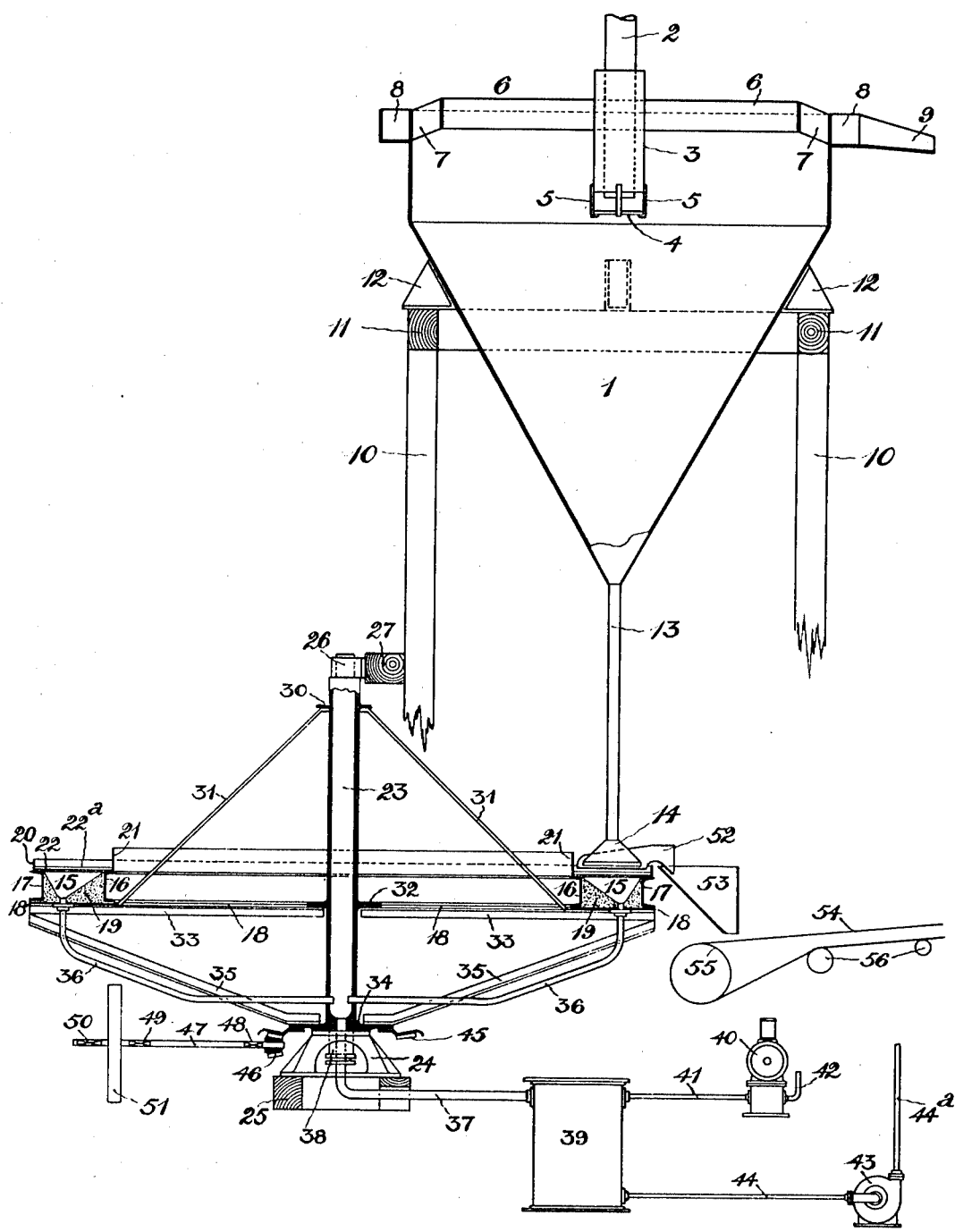

W. A. CALDECOTT.
SEPARATION OF LIQUIDS FROM CRUSHED ORE PRODUCTS.
APPLICATION FILED MAR. 18, 1907.

1,061,660.

Patented May 13, 1913.
2 SHEETS—SHEET 1.

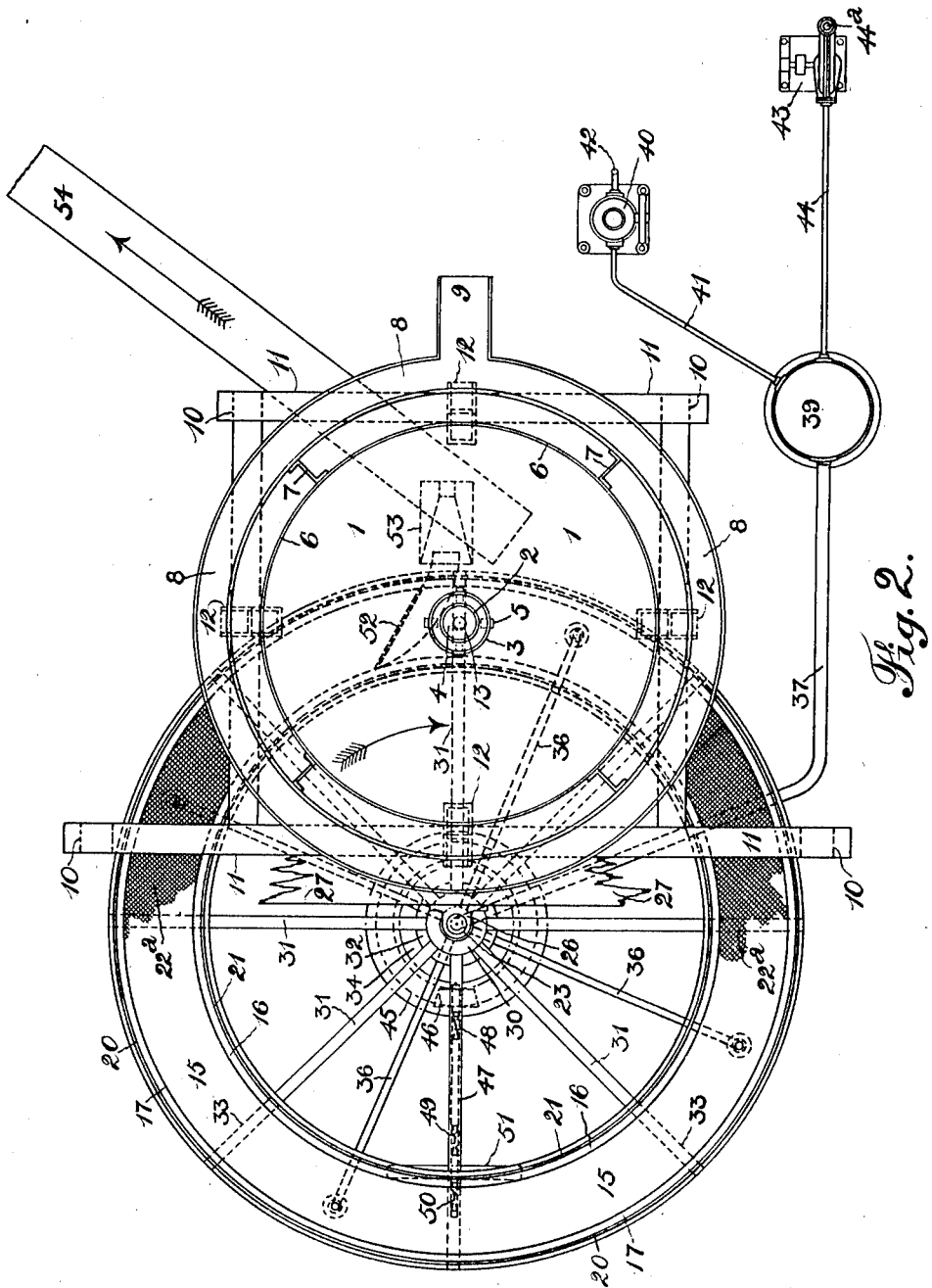

UNITED STATES PATENT OFFICE.

WILLIAM ARTHUR CALDECOTT, OF JOHANNESBURG, TRANSVAAL.

SEPARATION OF LIQUIDS FROM CRUSHED-ORE PRODUCTS.

1,061,660.

Specification of Letters Patent.

Patented May 13, 1913.

Application filed March 18, 1907. Serial No. 363,072.

*To all whom it may concern:*

Be it known that I, WILLIAM ARTHUR CALDECOTT, a subject of the King of Great Britain, and resident of Johannesburg, Transvaal, have invented certain new and useful Improvements in the Separation of Liquids from Crushed-Ore Products, of which the following is a specification.

This invention appertains to the separation of liquids (water, cyanid or other solvent solutions, water washes and the like) from crushed ore products.

The invention is designed more particularly for effecting the continuous separation of sand (the coarser and heavier particles of pulverized ore) from the mill pulp or crushed ore in a condition suitable for direct treatment in the leaching vats.

The invention in part is also applicable for effecting the separation of gold bearing solutions from pulp containing ore slime and sand, or ore slime or sand, or for clarifying the gold bearing cyanid solutions or water from suspended solid matter preparatory to the precipitation of the precious metal from such solutions or water, or for any other analogous purpose.

According to my invention, as applied more particularly to the separation of sand from mill pulp, or when the mixture to be treated contains a large percentage of solids, I first treat the pulp or mixture in an apparatus designed for continuously effecting the removal of the bulk of the liquid and slime from the pulp, and subsequently effect the separation of the remaining liquid by means of suitable filtering apparatus.

Instead of running the whole or part of the pulp entering a cyanid works into the ordinary sand collecting or settling vats, as is presently the practice, this pulp may be run into one or more of the apparatus for removing the bulk of the liquid and slime, and the concentrated residue, consisting of the sand and a small proportion of the slime, be delivered direct to the filtering apparatus whereby the greater portion of the remaining liquid will be separated and the moist residue be in a suitable condition for immediate and direct treatment in the leaching vats.

In the accompanying drawings I illustrate apparatus designed for the practical application of the invention and I will at once proceed with a detailed description of such apparatus.

Figure 1 represents the apparatus in part sectional elevation, while Fig. 2 represents it in plan.

The apparatus as shown, comprises a spitzkasten or conical classifier provided for removing from the mill pulp or mixture of solids and liquids, the bulk of the liquid and slime. This, as shown, consists of a receiving vessel 1 constructed like an inverted cone or pyramid in its lower portion and formed with vertical sides or walls in the upper portion.

2 designates a pipe for conducting the mill pulp into the receiving vessel 1. The pipe 2 is shown surrounded at its lower extremity by a concentric pipe 3, which latter carries a horizontally disposed baffle plate 4 fixed thereto by means of hooks or brackets 5.

6 is a ring or annular baffle fixed around the upper edge of the vessel 1 by means of brackets 7. The baffle plate 4 and baffle ring 6 are provided to insure effective precipitation of the sand in the receiver 1 by preventing their being carried out of the vessel by the out-flowing liquid and slime—the minute particles of the pulverized ore.

Surrounding the upper edge of the vessel 1 is an annular overflow launder 8 provided with a discharge spout 9, which launder 8 serves to receive the separated liquid and slime from which they may be conveyed in any suitable manner to the slime treatment vats or otherwise, as preferred.

The spitzkasten or conical classifier 1 is carried at a suitable altitude by means of the four posts 10 and horizontal beams 11, to which latter are fixed the brackets or members 12. To the receiver 1, at the apex, is fixed a vertically disposed outlet or discharge pipe 13 for the sand or underflow and to the lower extremity of this pipe is secured a piece 14 which forms a spreader for distributing said underflow.

As shown, the apparatus for the treatment of the underflow for effecting the final separation of the residual liquid therefrom, assumes the form of a rotary filter. It consists of a revoluble structure providing around its circumference a horizontally disposed annular vacuum chamber 15. This chamber is formed by the concentric channel irons 16 17 and the ring or annular plate 18 riveted or otherwise suitably fixed to said channel irons. The sides of the vacuum chamber 15 are inclined as shown imparting thereto a trough like form. The filling 19 forming the inclined sides of the chamber 15 may be of wood, concrete or other suitable material. 20 is a vertically disposed cylindrical piece fixed to the outer channel iron 17 and forming a rim or lip around the top of the vacuum chamber 15 on the outside, and 21 is a somewhat wider cylindrical piece fixed to the inner channel iron 16 forming a higher or deeper lip around the top of the vacuum chamber on the inside. Above the vacuum chamber 15 is arranged an annular piece of screening or wire gauze 22 of a suitably fine mesh and on top of the screening is placed filter cloth $22^a$ or fabric of suitable texture through the interstices of which the liquid passes or is drawn by the partial vacuum created in the chamber 15.

23 is a central vertically disposed rotatable hollow shaft which at its lower extremity runs in a footstep or other suitable bearing 24 shown supported on timbers 25. The upper extremity of the shaft 23 is shown running in a bearing 26 carried by a beam 27 fixed to the two vertical posts 10. The shaft 23 at or in proximity to its upper end is constructed to provide an external flange 30 to which are fixed the upper ends of the stays, or tie-rods 31, which latter at their lower extremities connect with the inner channel iron 16 or annular plate 18, or both. The shaft 23 is also constructed with an intermediate flange 32 shown at approximately the same level as the bottom of the vacuum chamber 15. This flange 32 has fixed to it the inner ends of the horizontal radial arms 33 which are fixed to and serve for supporting the parts 16, 17, 18, constituting the vacuum chamber 15. The shaft 23 at or in proximity to its lower end is constructed with a further flange 34 to which are fixed the inclined radial arms 35 which are connected at their other ends to and serve for supporting the vacuum chamber 15 around its circumference.

36 represent pipes (of which four are shown) communicating at one end with the bottom of the vacuum chamber 15 and at the other end with the interior of the hollow shaft 23.

37 represents a fixed pipe communicating with the interior of the vertical shaft 23 at the bottom, and 38 represents a stuffing box and gland making fluid-tight connection between the fixed pipe 37 and hollow shaft 23. The fixed pipe 37 communicates with the upper end of a suction chamber or vessel 39.

40 is an air pump placed in communication with the upper end of the suction chamber 39 by pipe 41 and 42 the outlet of the pump.

43 is a pump placed in communication through pipe 44 with the bottom of the suction chamber 39 for removing the liquid entering the suction chamber and $44^a$ is the discharge pipe from the pump 43. For imparting rotatory motion to the hollow shaft 23 I show a bevel wheel 45 fixed to the bottom flange 34.

46 designates a bevel pinion fixed on a shaft 47 and meshing with the bevel wheel 45. The shaft 47 is supported by bearings 48, 49 and 50, and 51 is a belt pulley fixed to said shaft 47.

The rotary vacuum filter is so arranged in relation to the spitzkasten or conical classifier 1 that the under-flow issuing from the latter is delivered on to the filter cloth $22^a$ and spread over practically the whole width of the cloth by the spreader 14. The latter is arranged to deliver the concentrated underflow at or about the level of the outer rim or lip 20 so that the underflow is delivered on to a bed or layer of the sand equal or approximately equal to the depth of said outer lip.

52 is a scraper or plow for removing the sand or moist residue remaining on the surface of the filter cloth. This scraper or plow is so constructed and arranged as to divert the sand into a hopper 53, which latter is shown arranged to deliver the sand on to a belt conveyer 54 for conveying it to the leaching vats.

55 is the take up pulley of the belt conveyer and 56 are the idlers for the underlay.

As shown in Fig. 2 the scraper 52 is preferably arranged to remove the moist sand from the surface of the filter cloth $22^a$ just before the latter passes underneath the spreader 14 so that the underflow deposited on the filtering medium is subjected to the influence of the partial vacuum created in the chamber 15 during a complete revolution.

In the operation of the apparatus the mill pulp enters the spitzkasten or classifier 1 by the pipe 2 and the sand is precipitated, the bulk of the liquid and slime flowing over the upper end into the overflow launder 8. The underflow or concentrated residue is continuously delivered upon the filter cloth $22^a$ and the remaining liquid, aided by the partial vacuum created in the chamber 15, passes through the interstices of the cloth and is drawn from the chamber 15 through the pipes 36, hollow shaft 23 and fixed pipe 37 into the suction chamber 39 from which it is withdrawn by the pump 43. The partially dried layer of sand or solid matter remaining on the surface of the filter cloth $22^a$ is continuously removed by the scraper 52 and delivered on to the belt conveyer 54 by which it is transferred to the leaching vats for treatment therein.

As applied for effecting the separation of gold bearing solutions from pulp containing ore slime or sand, or ore slime and sand, or for clarifying gold bearing cyanid solutions or water from suspended solid matter preparatory to the precipitation of the precious metals, or when the mixture contains a comparatively small quantity of solids, the spitzkasten or classifier 1 may be dispensed with and the mixture of liquids and solids be delivered directly on to the filtering media above the vacuum chamber 15.

What I claim as my invention and desire to protect by Letters Patent is:—

The process of preparing metal-bearing sands for leaching, consisting in subjecting the pulp, containing sands and slimes, continuously to such a settling and decanting separation as will separate the slimes and the bulk of the water from the sands, continuously discharging the sands and subjecting them to vacuum filtration to extract substantially all the water accompanying said sands, the sands and slimes, once separated, being maintained separate.

In witness whereof I have hereunto set my hand in the presence of two subscribing witnesses.

WILLIAM ARTHUR CALDECOTT.

Witnesses:
CHAS. OVENDALE,
R. OVENDALE.